United States Patent
Helenelund et al.

(10) Patent No.: US 9,217,752 B2
(45) Date of Patent: Dec. 22, 2015

(54) METHOD AND SYSTEM FOR MEASURING MOTIONS

(75) Inventors: Christer Helenelund, Hamari (FI); Anders Viktor Thoreson, Hamari (FI)

(73) Assignee: Oy Baltic Instruments Ab, Hamari (FI)

( * ) Notice: Subject to any disclaimer, the term of this patent is extended or adjusted under 35 U.S.C. 154(b) by 81 days.

(21) Appl. No.: 14/127,504

(22) PCT Filed: Jun. 20, 2012

(86) PCT No.: PCT/FI2012/050645
§ 371 (c)(1),
(2), (4) Date: Apr. 1, 2014

(87) PCT Pub. No.: WO2012/175808
PCT Pub. Date: Dec. 27, 2012

(65) Prior Publication Data
US 2014/0202366 A1    Jul. 24, 2014

Related U.S. Application Data

(60) Provisional application No. 61/499,191, filed on Jun. 21, 2011.

(30) Foreign Application Priority Data

Jun. 21, 2011   (FI) ...................................... 20115632

(51) Int. Cl.
*B63B 39/00* (2006.01)
*G01P 5/00* (2006.01)
*B63B 39/14* (2006.01)

(52) U.S. Cl.
CPC . *G01P 5/00* (2013.01); *B63B 39/00* (2013.01); *B63B 39/14* (2013.01)

(58) Field of Classification Search
USPC .......................................................... 114/121
IPC .... B63B 39/06,39/00, 39/08, 39/14; G01P 5/00
See application file for complete search history.

(56) References Cited

U.S. PATENT DOCUMENTS

| | | | |
|---|---|---|---|
| 3,052,120 A * | 9/1962 | Goodman et al. | 73/148 |
| 3,623,444 A | 11/1971 | Lang | |
| 4,518,822 A * | 5/1985 | Martinez | 379/102.02 |
| 2005/0278094 A1* | 12/2005 | Swinbanks et al. | 701/37 |
| 2006/0058929 A1 | 3/2006 | Fossen et al. | |
| 2007/0168126 A1 | 7/2007 | Wence et al. | |
| 2009/0114136 A1 | 5/2009 | Ayres | |
| 2011/0276305 A1* | 11/2011 | Rinnan et al. | 702/141 |

\* cited by examiner

*Primary Examiner* — Stephen Avila
(74) *Attorney, Agent, or Firm* — Seppo Laine Oy

(57) ABSTRACT

The invention is related to a method and system for measuring motions of a moving, essentially rigid, floating (elongated) body such as a boat, yacht or vessel using two motion detectors that are installed near the ends of, or far enough away from each other in the (elongated) floating body. In accordance with the invention the two motion detectors are essentially simultaneously measuring the movements of the floating body.

18 Claims, 3 Drawing Sheets

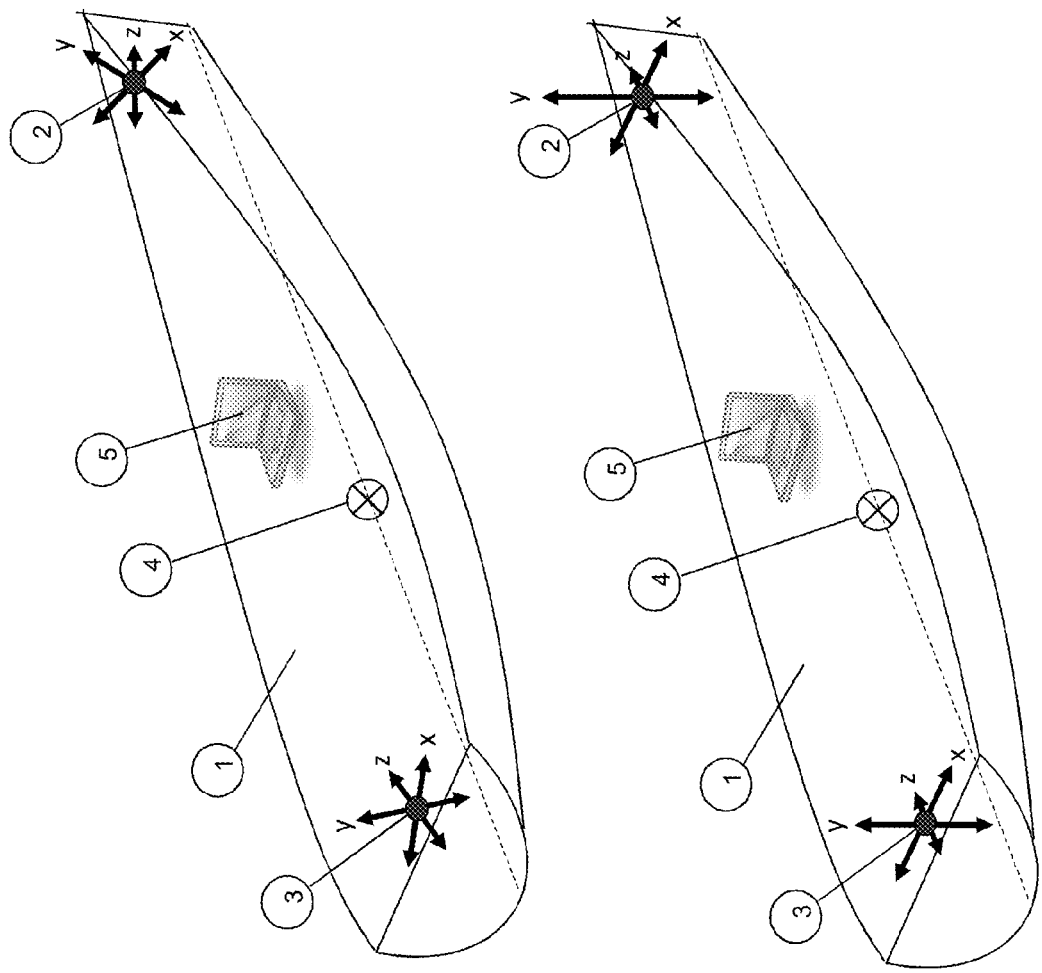

METHOD AND SYSTEM FOR MEASURING MOTIONS

The invention consists of a method and a system for detecting motions in ordinary sailing yachts and power boats with the aim to improve their performance, maneuverability, comfort, safety and energy efficiency. Specifically the document describes how such a system can be realized taking into consideration the cost constraints, physical conditions and practicalities relevant for small or ordinary sized yachts and power boats.

FIELD OF APPLICATION

Most ordinary cars today are equipped with several motion detectors. 25 years ago few would have thought this would be the case. Back then it was not easy to understand what motion detection could be used for. Today we know that a modern car has motion detectors at least for active suspension, anti-lock brakes, anti-spinning systems and for activating airbags or safety belts in case of a collision. It goes without saying that motion detection is at least equally common in today's aircrafts. Motion detection in small or ordinary yachts and boats is today quite similar as for cars 25 years ago.

Motion detectors are indeed used in ships, for stabilizing some gyro compasses, in satellite receivers and in some advanced autopilots, but a broader use of motion detection is still rare in smaller vessels for leisure or private use. This despite that also smaller yachts and boats often face waters and weather far from calm. So ordinary yachts and boats are subject to motions in the same way as larger crafts and even if they in average perhaps are used in more sheltered waters their smaller size makes motions relatively bigger.

Any motion of a rigid body floating on the sea can be fully described by dividing the motion into three linear and three rotational sub-motions acting relative to a 3-dimensional coordinate system with three mutually perpendicular axes which crosses in the vessel's Center of Motion (CoM) and where one axis coincidences with the floating body's longitudinal roll-axis and another with its transverse pitch-axis. These six sub-motions that also are called six Degrees Of Freedom (6 DOF) of a rigid body are commonly described using the following names:

Linear Sub-Motions:
1. Heaving (moving up and down)
2. Swaying (moving left and right)
3. Surging (moving forward and backward)

Rotational Sub-Motions:
4. Pitching (tilting forward and backward)
5. Yawing (turning left and right)
6. Rolling (tilting side to side)

These motions are normally measured or calculated relative to the CoM, which not always is the same as the vessel's center of mass. In practice the CoM is a function of several factors, mainly the center of mass, the center of mass of the moving ballast (such as crew etc.), the vessel's momentary center of buoyancy, impact of engine or sail power and hydro- or aerodynamic forces caused by flow, waves and wind on the hull and foils on the vessel.

PRIOR ART

6 DOF sensors or sensors for a part of these motions are today used in aircrafts, ships, submarines, super yachts, work vessels and in some yachts and boats intended for professional racing, but are far too expensive for ordinary yachts and boats. The price of mass fabricated Microelectromechanical Systems (MEMS) type of motion detectors or accelerometers commonly used in cars and mobile devices has radically decreased, but sensors based on these are as such not always accurate enough for measuring all motions in a vessel. For instance their gravity based tilt measurements are too rough for measuring pitch and cannot at all be used for measuring yaw.

Shortcomings in Prior Art

As earlier concluded no affordable motion detection system with sufficient performance is today available for ordinary sailing yachts and power boats. High performance motion sensors exist for ships and airplanes, but are far too expensive for ordinary boats. The performance of the low cost MEMS motion detectors that are used in cars and mobile platforms is not good enough as their accuracy in dynamic use is not sufficient. In static conditions their pitch and roll measurement might provide for an accuracy of 1 degree, but the accuracy in dynamic conditions is many times two or even five times worse. In order to understand the requirement for accuracy—A two degree uncertainty in pitch measurement corresponds to a dive or rising of the bow of 0.17 m if the distance between the bow and the CoM is 5 m. Does not seem much, but this will have a major impact on the hydrodynamic behavior of the hull in a small craft. An additional challenge when measuring motions in small yachts and boats is that the motions, due to the vessel's relatively small mass, are quite rapid which consequently requires a rapid and frequent detection of the motions, typically around 40 Hz, preferably in the range of 5-100 Hz, or in some cases even up to 500 Hz.

Why are the bare MEMS sensors so inaccurate? The most common factors affecting their accuracy are resolution, non-linearity, cross-axis error, sensitivity error and zero point (offset, bias) error. These factors depend on the sensor assembly, encapsulation, operating conditions, the sensor setup in the end-user application and whether there is a possibility to re-calibrate the system in the end-user application. Resolution is an ultimate limit for accuracy. Other factors reduce the accuracy, but with the right compensation their impacts are reasonable. In gravity based tilt measurements the cross-axis sensitivity is essential. This is caused by mounting errors of the sensor chips and can in the worst case cause a cross-axis error as high as ±5%.

There are practical problems in using motion detections too, installation for instance. If only one 6 DOF sensor is used it would be tempting to install it in the vessel's Center of Motion (CoM) so that the linear motions measured would not require recalculation relative to the center. However, as this point is not well defined nor is it always possible to install a detector in a desired "optimum" location, the sensor is typically installed nearby the CoM (or center of mass) which then also requires recalculation. The recalculation is basically straightforward, but as the exact location of the CoM in most cases is vague and varying, this adds uncertainty and inaccuracy to the recalculation. For this and also other reasons (discussed underneath) it is therefore interesting to be able to continuously calculate the vessel's CoM based on the measurements from two motion detectors, located along the centerline at a certain distance from each other.

SE-522964C2 discusses a motion detection system for ships that in its basic form consists of one motion sensor usually installed in the forepart of the vessel and where motions are calculated relative to a fixed CoM, which apparently is determined during the installation of the measuring system or in the harbor during the loading of the ship. This is perhaps sufficient for a large ship where the moving ballast during the voyage generally might be quite small. In a small yacht or boat where the motions and also the moving ballast are relatively bigger the CoM is not fixed.

For the calculation of torsion and hull stresses according to SE-522964C2 at least two sensors are used; one in the bow and another fitted towards the stern. This setup is however not used for continuous dynamic calculation of CoM and yawing as in our invention. Nor is it in SE-522964C2 emphasized that the real advantage of using two sensors really is to achieve an improved accuracy of the measurement of the rotational motions, nor that this specifically enables a system with good accuracy even when using low cost motion sensors. Nor does SE-522964C2 mention that yawing can be measured without the use of a gyro or magnetometer.

SE-522964C2 furthermore does not mention the possibility to install the motion sensor(s) in any direction. In our invention this is possible as the software in the computer 5 can determine the 3D detectors angular orientation based on statistical measurements of the gravity and numerically re-align the data so that it corresponds to the 3 dimensional coordinate system that coincidence with the vessel's longitudinal roll and transverse pitch axes. This is a valuable practical advantage as the installation many times will be done by the boater and as bulkheads or balks on which the detectors are installed not always are perpendicular to the vessel's longitudinal roll axis.

JP63029279 introduces a bow azimuth measuring instrument that is based on latitude and longitude measurements by means of "worldwide position measurement systems" at two locations in a ship; in the bow and stern, and smoothing and correcting the data obtained in order to calculate the turning speed of the ship. As the measurement frequency of GPS receivers is low and position accuracy of a single position measurement rather poor such a system can obviously not be used for measuring the rapid motions of a small yacht or boat. The system in JP63029279 can thus not be seen as system for measuring dynamic 6 DOF motions in ordinary yachts and boats.

CHARACTERISTICS OF THE INVENTION

The basic idea with the invention is to improve the price structure and ease of installation of the motion detection system so that it becomes both affordable and also possible to be installed by ordinary yachtsmen and boaters. Based on the measurements of the motion detection system several secondary parameters can be calculated and a multitude of new functionalities implemented, several of which in turn will have a positive effect on the vessel's performance, energy efficiency, maneuverability, onboard comfort and safety.

Presentation of the Problem

In additions to wind and wind induced waves and swell yachts and boats many times are also effected by secondary waves (reflected from rocks and shore), wakes from other boats, currents etc. Additionally the engines, the sails, the trims, the crew or changes in the load will create motions to the vessel. So ordinary yachts and boats are subject to motions in the same way as larger crafts and even if they in average perhaps are used in more sheltered waters their smaller size makes motions relatively bigger.

So why should we at all measure and control the motions? Let's start by concluding that most motions on a vessel have a negative impact on the vessel's performance, maneuverability and the onboard comfort. This is easy to understand when you think of a yacht or boat in heavy sea. In case of a power boat the speed has to be reduced. In case of a sailing yacht the power of the sails must be reduced. In both cases extraordinary attention must be given to steering in the waves. By steering well the in waves their impact on the hull and slamming can be minimized and the vessel's speed thus kept at a reasonable high and constant level. By proper steering it is therefore possible to keep a higher average speed and also save fuel. Moreover, if the motions of the vessel, by proper steering and/or adaptive motion control is reduced with 10-20%, this will also have a clear positive effect on the maneuverability and comfort and thus indirectly also on safety. The control of the motions can in some cases also improve energy efficiency, but not always—For instance a more-or-less complete roll compensation might easily consume so much energy that the net energy saving will be negative.

The motions of a yacht are also effecting other onboard measurements, for example wind and sometimes also depth and speed measurements. So if the motions are known their impact on the other measurements can be compensated for resulting in more accurate readings. I.e. True Wind measurements can be essentially improved by compensating for speed, heeling, rolling and leeway, which in turn will enable more accurate calculations of Velocity Made Good (VMG) and performance, all which are essential to know in a racing yacht.

So as a conclusion—There are several good reasons to measure and control motions also in ordinary yachts and boats. For controlling the motions and in order to ensure proper headway making manually a measurement and a (computer based) guidance system can provide good support and also a possibility for later follow-up, while automatic motion control requires (in addition to measurement) a computer, steering logic as well as an autopilot and possibly also other means (actuators) for reducing the motions.

How the Invention Solves the Problem

The invention consists of a method and a system using two motion detectors, one installed near the bow and another near the stern of the vessel, both of which are measuring the vessel's motions essentially at the same time. This in order to essentially improve the sensitivity and thus also the accuracy of the measurements of the vessel's rotational motions. This can be achieved despite only low cost MEMS sensors are used in the setup. If an enough sensitive accelerometer is used in the motion detectors the invention enables also the measurement of Yawing (the rotational measurement around the vertical axis) without using a magnetometer. In single sensors measuring 6 DOF a magnetometer is always needed.

ADVANTAGES OF THE INVENTION

There are several advantages with the invention:
- It forms a basis for improving the vessel's performance, maneuverability, onboard comfort and safety. Improving performance means many times also better energy efficiency.
- The sensitivity and thus also the accuracy of pitch and yaw measurements can be essentially improved despite that only low cost MEMS type of sensors are used in the setup
- The yaw measurement can be done without a magnetometer
- A price structure can be achieved that enables the use of the motion detection system also in ordinary yachts and boats.

Accuracy of the roll measurement can be improved

The locations for installing the motion detectors and their alignment are not critical. The end user can therefore install the motion detectors themselves making the system even more affordable.

The location of the CoM can be calculated on real time basis from the measured motions. This is interesting during races when the crew is trying to maximize the speed also by changing the weight distribution as the speed of the vessel to a large extent also depends on the size and shape of the wetted area of the hull.

The system can be used as the basis for improving the accuracy of other onboard measurements.

The logging or recording of motion data can later be replayed, reviewed and analyzed. This might be interesting after a race or a challenging cruise If parts of the recorded motion data, and/or data collected from other measurements or the route are modified we can during replay perform what-if-analysis The recording of motion data enables the measurement of the duration of complete or parts of maneuvers in order to form a basis for efficiency measurement and to support coaching and learning.

The motion measurement can be used as a reference and supporting system for manual corrections of the vessel's headway and motions.

The motion measurement can be used as a reference and supporting system for automatic and adaptive control of the headway and motions.

The motion measurement can be used as a reference and supporting system for a self-learning system for automatic steering and/or motion control The motion measurement can be used as a reference and supporting system when using an experienced helmsman to steer the boat in order to teach the automatic steering system.

The motion measurement can be used for the calculation and reporting the state of the local sea conditions, such as waves and wind.

The sea conditions calculated by the motion measurement system can, by means of radio or satellite transmission, be transferred to other vessels or alternatively to third party users for further data processing and/or distribution.

PRESENTATION OF FIGURES

In the following, the invention is examined with the aid of examples of embodiments according to the accompanying figures.

FIG. 1 shows a perspective view of an embodiment of the invention.

FIG. 2 shows a perspective view of the method in accordance with the invention.

EXAMPLES OF APPLICATIONS OF THE INVENTION

Figure 3:
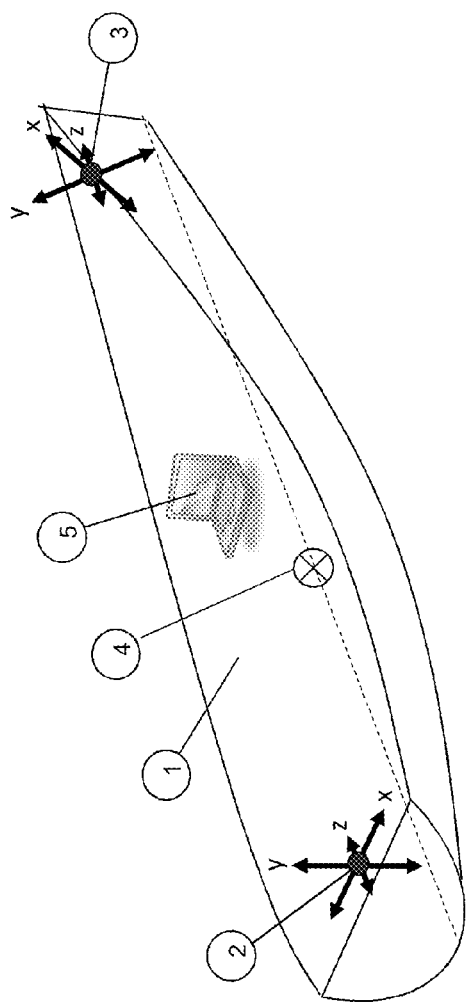
FIG. 3 shows a perspective view of the method in accordance with the invention.
Figure 4:
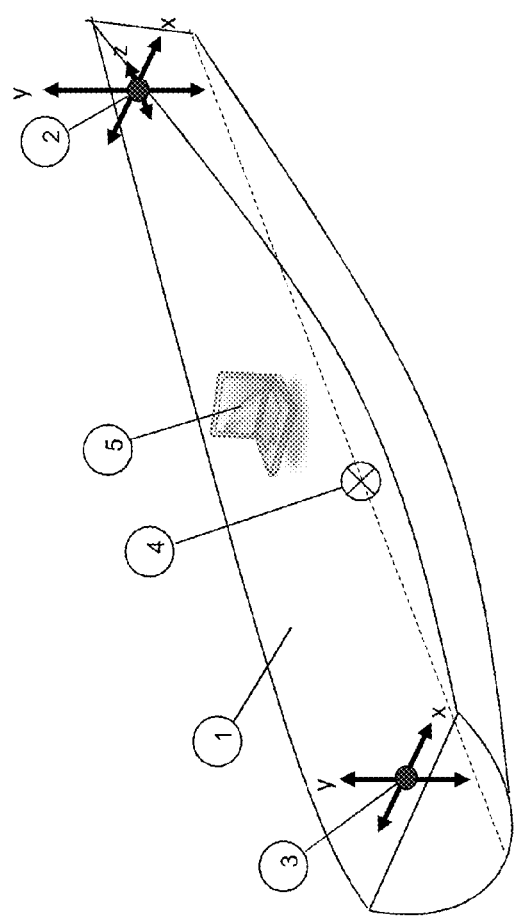
FIG. 4 shows a perspective view in another situation of the method in accordance with the invention.
Figure 5:
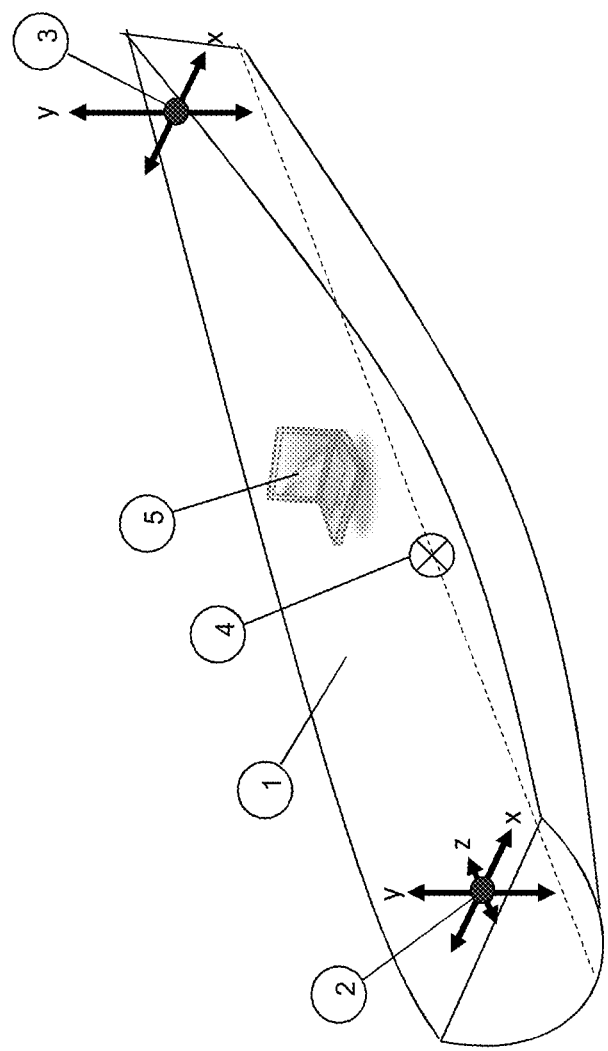
FIG. 5 shows a perspective view in another situation of the method in accordance with the invention.

In accordance with FIGS. 1-5 the invention is typically implemented in the following way:

A "Six degrees of freedom" (6 DOF) motions of an essentially rigid, floating (elongated) body 1 such as a boat, yacht or vessel using two motion detectors 2, 3 is measured such that the two motion detectors 2, 3 are installed near the ends of the elongated floating body 1.

In one typical and advantageous solution of the invention the two motion detectors are positioned in line with or near the longitudinal vertical plane (cross section) in the middle of the floating body 1.

In another typical and advantageous solution of the invention the two motion detectors 2, 3 are essentially simultaneously measuring the movements in the floating body 1.

In another typical and advantageous solution of the invention each of the two motion detectors 2, 3 which are installed in the floating body 1 according to previous examples are measuring the linear motions separately along three mutually perpendicular axes installed without that the axes of the two motion detectors are parallel with each other. This setup allows the motion detectors to be installed into any direction near the ends of the vessel. This simplifies installation on bulkheads, walls and balks which are not necessarily perpendicular with the vessel's longitudinal roll axis. This is due to an automatic calibration feature in the software of the fixed or mobile onboard computer 5 which during calm conditions at the dock can determine the angular orientation of the motion detectors. This is done based on statistical analysis of a multitude of gravity measurements by means of which the software numerically realigns the motion detectors so that motion measurements during actual use represents the motions of two 3-dimensional coordinate systems which are parallel with the vessel's longitudinal roll and transverse pitch-axes.

In another typical and advantageous solution of the invention each of the two motion detectors 2, 3 in to previous examples are measuring the linear motions separately along three mutually perpendicular axes installed in the floating body 1 so that each axis of each detector are parallel with the 3-dimensional coordinate system with three mutually perpendicular axes which crosses in the floating body's 1 center of mass and where one axis is co-linear with the floating body's 1 longitudinal roll-axis and another with its transverse pitch-axis. Installation of the motion detectors is here more complicated and time consuming, but this setup requires no numerical re-alignment which simplifies initialization, data processing and improves the overall response time of the motion measurement.

In another typical and advantageous solution of the invention one of the motion detectors 2, 3 mentioned in the previous embodiments is turned 45 degrees around the axis that is parallel with floating body's 1 longitudinal roll-axis. By this the accuracy of the roll measurement can be further improved as this increases the likelihood that one of the four accelerometers used in the tilt measurement setup for determining the rolling will operate at its most sensitive angle range relative to the gravity vector. When measuring pitch and yaw the motion detector that is turned 45 degrees needs naturally to be numerically re-aligned in order to be able to provide information that is parallel to the vessel's longitudinal roll axis and traverse pitch axis.

In another typical and advantageous solution of the invention the position of the CoM 4 along the floating body's 1 longitudinal roll-axis will be calculated from the motions measured perpendicular to the longitudinal roll-axis by the motion detectors 2, 3 in accordance with any previous embodiment of the invention. This calculation can be performed on real time basis by using simple formulas known from solid mechanics. Based on this all motions and the moment of inertia can be calculated as a reference of the exact center and keeping at the same time the crew continuously aware of the weight distribution in the vessel. This as the speed of the vessel to a large extent also depends on the size and shape of the wetted area of the hull.

In another typical and advantageous solution of the invention the position of CoM 4 along the floating body's 1 longitudinal roll-axis is calculated from the motions calculated in accordance with any previous embodiment of the invention, perpendicular to the longitudinal roll-axis based on the measurements of the motion detectors 2, 3. This is relevant for the case where the motion detectors are installed according to claim 4 or 6 and where the motion data has been subject for numerical realignment.

In another typical and advantageous solution of the invention the heaving, the swaying, the pitching and the yawing of the floating body 1 is calculated from the linear motions detected by the motion detectors 2, 3 and which are perpendicular to the floating body's 1 longitudinal roll-axis in accordance with any previous embodiment of the invention. This calculation can be done by using simple formulas known from solid mechanics.

In another typical and advantageous solution of the invention where the heaving, the swaying, the pitching and the yawing of the floating body 1 is calculated from the recalculated measurements from the motion detectors 2, 3 and which are perpendicular the floating body's 1 longitudinal roll-axis in accordance with any previous embodiment of the invention. This is relevant for the case where the motion detectors are installed according to claims 4 and 6 and where the motion data has been subject for numerical re-alignment.

In another typical and advantageous solution of the invention the rolling of the vessel can be calculated as an average of four tilt calculations that are based on measuring or recalculating the motions perpendicular to the floating body's 1 longitudinal roll-axis in accordance with any previous embodiment of the invention. In the rolling measurement the four tilt measurements (two per each motion detector) measures or recalculates the gravitational components of the axes perpendicular to the longitudinal roll-axis of the vessel. With these we can calculate the roll angle either as the average of all four tilt measurements or, depending on the angles of the individual acceleration measurements relative to the gravity vector, by weighting the results so that only the tilt measurements giving the best angular accuracy are used for the roll measurement.

In another typical and advantageous solution of the invention the surging of the vessel can be calculated as an average from the motions detected or recalculated from the two motion detectors 2, 3 parallel with the longitudinal roll-axis of the floating body 1 in accordance with any previous embodiment of the invention.

In another typical and advantageous solution of the invention the surging calculated in accordance with any previous embodiment of the invention can be integrated to a velocity that is frequently compared with and recalibrated against the velocity obtained from a GPS used in the floating body. If surging is measured as acceleration and must be recalculated to a velocity or distance the calculation of the numerical integration must from time-to-time be recalibrated against another measurement such as the velocity or distance obtained from a GPS. This must be done with care and taking into consideration that the two velocity measurements to be compared are corresponding to the same, long enough time interval.

In another typical and advantageous solution of the invention in accordance with any previous embodiment of the invention, but where the two motion detectors (2, 3) are periodically time synchronized with each other.

In another typical and advantageous solution of the invention in accordance with any previous embodiment of the invention, but where the motion measurement system in the floating body 1 is collecting and recording motion data that later can be replayed, reviewed and analyzed.

In another typical and advantageous solution of the invention in accordance with any previous embodiment of the invention the previously mentioned analysis can be done on what-if-basis, so that parts of the recorded motion data, data collected by other measurements or the route are modified. This gives the sailor or boater a possibility to analyze alternative setups in the route or different routes based on a combination of measured, modified and recalculated data.

In another typical and advantageous solution of the invention in accordance with any previous embodiment of the invention, but where the motion measurement system is used for measuring the duration of complete or parts of maneuvers in the floating body 1 in order to form a basis for efficiency measurement and to support coaching and learning.

In another typical and advantageous solution of the invention in accordance with any previous embodiment of the invention, but where the motion measurement system is used as a reference and supporting system for manual corrections of the floating body's 1 headway and motions. This is done by manual steering or manually changing the position of the moving ballast (such the crew, tanks, canting keels, ballast tanks etc.).

In another typical and advantageous solution of the invention in accordance with any previous embodiment of the invention, but where the motion measurement system is used as a reference and supporting system for automatic and adaptive control of the floating body's 1 headway and motions. This requires a steering logic based on which controls an autopilot or other actuators onboard.

In accordance with one preferred embodiment of the invention the motion measurement is used as a reference and supporting system for a self-learning system for automatic steering and/or motion control of the floating body (1). This can be accomplished by forcing the steering logic to give steering pulses of different amplitude to the autopilot or to the control system and let the motion detection system measure the reaction. Thereafter the steering logic can adopt itself to the dynamic properties of the vessel and the prevailing sea conditions.

In accordance with one preferred embodiment of the invention the motion measurement is used as a reference and supporting system when using an experienced helmsman to steer the floating body 1 in order to teach the automatic steering system.

In another typical and advantageous solution of the invention in accordance with any previous embodiment of the invention, but where the motion measurement system based on the collected motion data can calculate and report the state of the local sea conditions, such as waves and wind. This is done by analyzing and recalculating the obtained motion data in regard to other onboard measurements such as vessel speed, course, position and wind.

Waves are measured as in moored wave buoys, but taking into consideration the vessel's mass, hydrodynamic shape, course and speed relative to the waves.

In another typical and advantageous solution of the invention in accordance with any previous embodiment of the invention, but where the information of the local sea conditions by means radio or a satellite transmission is transferred to other vessels or alternatively to third party users for further data processing and/or distribution. Based on this data from several vessels more complete and accurate information on the sea and wind conditions can be obtained also for a larger geographical area. Based on this the boater may be able to get true real time data on the conditions prior a more demanding part of the race or route and make decisions on whether to delay or re-routing the cruise for better safety or convenience.

One example of the invention is a system for measuring "six degrees of freedom" (6 DOF) motions of a moving, essentially rigid, floating (elongated) body 1 such as a boat, yacht or vessel using two motion detectors 2, 3 that are installed near the ends of, or enough far away from each other in the (elongated) floating body 1 characterized by that the two motion detectors 2, 3 are essentially simultaneously measuring the movements in (would "motions of" be better instead of "movements in") the floating body 1.

Another system according to the previous system definition the motion detectors 2, 3 in the floating body 1 are essentially similar.

Practical Implementation

In the description of this invention the words "motion detection" is referred to as a detector that generally is measuring motion, no matter if we talk about measuring linear or rotational motion in terms of distance/angle, velocity/angular velocity or if we talk about acceleration/angular acceleration. As known from the physics these terms differ from each other in the time domain so that acceleration is the derivate of velocity while velocity is the derivate of distance. In practice different types of motion detectors measures typically motion in one specific time domain, so if we want to know the motion in other time domains this must (depending on the primary measurement) be done either by derivation or integration. In computerized systems this is of course done numerically. Derivation is really easy to do numerically, but numerical integration requires information of the starting situation or in case the integration is done for long, the measurement must from time-to-time be recalibrated or compared against another measurement or by different kind of reasoning and/or filtering. An example of this is the calculation of surging (the linear forward or backward motion). If surging is measured as acceleration and must be recalculated to a velocity or distance the calculation of the numerical integration must from time-to-time be recalibrated against another measurement such as the velocity or distance obtained from a GPS. This must be done with care and taking into consideration that the two velocity measurements to be compared are corresponding to the same, long enough time interval. Similar calibrations are obviously equally relevant for the other motion calculations although we in most of these can assume that the average of many motions will be zero or a constant value. This is the case at least for the measurements of heaving and pitching, where numerical filtering or similar can be successfully used.

All this is of course well known from the physics, but represents a challenge in the practical implementation. This is especially challenging in case of small sailing yachts and boats as the dynamic behavior of different kind of leisure crafts differs so much from each other so it is not self evident that one solution will be sufficient for all. If the motion detectors used in this invention are measuring acceleration it might therefore, for this particular reason, be an advantage to add an optional measurement measuring vertical position into or next to one or both of the motion detectors used in the invention. These position sensors could be based on using a simple gauge tube with a liquid connected to a pressure sensor in one or both of the motion detectors (installed in the bow and stern of the vessel) or alternatively to one or two optical level sensors capable of detecting the liquid level in the gauge tube. In such an arrangement one could as an alternative also detect the speed of the rotation by measuring the flow of the liquid in the gauge tube by using a sensitive flow sensor.

The invention claimed is:

1. A method for measuring six degrees of freedom motions of a moving, essentially rigid floating body, said method comprising the steps of;
    locating two motion detectors near the ends of, or far enough away from each other in, the floating body, so that they are measuring linear motions separately three mutually perpendicular axes in the floating body so that each axis of each detector is parallel with a 3-dimensional coordinate system with three mutually perpendicular axes which cross in a center of mass of the floating body, and where one axis is parallel with a longitudinal roll-axis of the floating body and another axis is parallel with a transverse pitch-axis of the floating body, and
    essentially simultaneously determining the motions of the floating body using the two motion detectors.

2. The method in accordance with claim 1, further comprising the step of periodically time synchronizing the two motion detectors with each other.

3. The method in accordance with claim 1, further comprising the step of locating the motion detectors in line with or near a longitudinal vertical plane cross section in the middle of the floating body.

4. The method in accordance with claim 1, further comprising the step of locating the motion detectors in the floating body and measuring the linear motions separately along three mutually perpendicular axes, wherein the axes of the two motion detectors are not parallel with each other.

5. The method in accordance with claim 1, further comprising the step of turning one of the motion detectors 45 degrees around an axis that is parallel with a longitudinal roll-axis of the floating body.

6. The method in accordance with claim 1, wherein the essentially simultaneously determined motions are perpendicular to a longitudinal roll-axis of the floating body, and wherein the method further comprises the step of calculating heaving, swaying, pitching or yawing of the floating body from the determined motions.

7. The method in accordance with claim 1, further comprising the steps of; recalculating essentially simultaneously measured motions perpendicular to a longitudinal roll-axis of the floating body to account for the motion detectors' locations and orientations relative to a center of motion of the floating body and/or axes of the floating body, and calculating heaving, swaying, pitching or yawing of the floating body from the recalculated measured motions.

8. The method in accordance with claim 1, wherein the essentially simultaneously determined motions are perpendicular to a longitudinal roll-axis of the floating body, and wherein the method further comprises the step of calculating rolling of the vessel as a weighted average value of up to four tilt calculations that are based on the measured motions.

9. The method in accordance with claim 1, wherein the essentially simultaneously determined motions are parallel with a longitudinal roll-axis of the floating body and wherein the method further comprises the step of calculating surging of the vessel as an average of the measured motions.

10. The method in accordance with claim 9, further comprising the step of integrating the calculated surging to a velocity that is frequently compared with and recalibrated against the velocity obtained from a GPS used in the floating body.

11. The method in accordance with claim 1, wherein the essentially simultaneously determined motions are perpendicular to the longitudinal roll-axis of the floating body, and wherein the method further comprises the step of calculating a position of Center of Motion along the floating body's longitudinal roll-axis from the measured motions.

12. The method in accordance with claim 1, further comprising the steps of collecting and recording the essentially simultaneously determined motions, wherein the collected and recorded measured motions can be replayed, reviewed and analyzed.

13. The method in accordance with claim 1, further comprising the step of recording the essentially simultaneously determined motions for what-if-analysis so that parts of the recorded motion data, and/or data collected from other measurements or the route are modified.

14. The method in accordance with claim 1, further comprising the step of determining the duration of complete or parts of maneuvers in the floating body, based on the essentially simultaneous determined motions in order to form a basis for efficiency measurement and to support coaching and learning.

15. The method in accordance with claim 1, further comprising the step of automatically and adaptively controlling the floating body's headway and motions based on the essentially simultaneously measured determined motions used as a reference and supporting system.

16. The method in accordance with claim 1, further comprising the step of calculating and reporting the state of the local sea conditions based on the essentially simultaneously determined motions.

17. A system for measuring six degrees of freedom motions of a moving, essentially rigid, floating body, said system comprising: two motion detectors installed near the ends of, or far enough away from each other in the floating body, so that they are capable of essentially simultaneously measuring linear motions of the floating body separately along three mutually perpendicular axes in the floating body so that each axis of each detector is parallel with a 3-dimensional coordinate system with three mutually perpendicular axes which cross in a center of mass of the floating body, and where one axis is parallel with a longitudinal roll-axis of the floating body and another axis is parallel with a transverse pitch-axis of the floating body.

18. The method in accordance with claim 1, wherein essentially simultaneously determining the motions of the floating body includes the step of automatically calibrating the measured linear motions using gravity measurements to numerically realign the motion detectors so that the essentially simultaneously determined motions represent the motions of two three dimensional coordinate systems which are parallel with the vessel's longitudinal roll and traverse pitch-axes.

* * * * *